Dec. 17, 1968  M. CRADDOCK  3,417,290
OIL WELL PUMPING UNIT CONTROL CIRCUIT
Filed Oct. 24, 1966
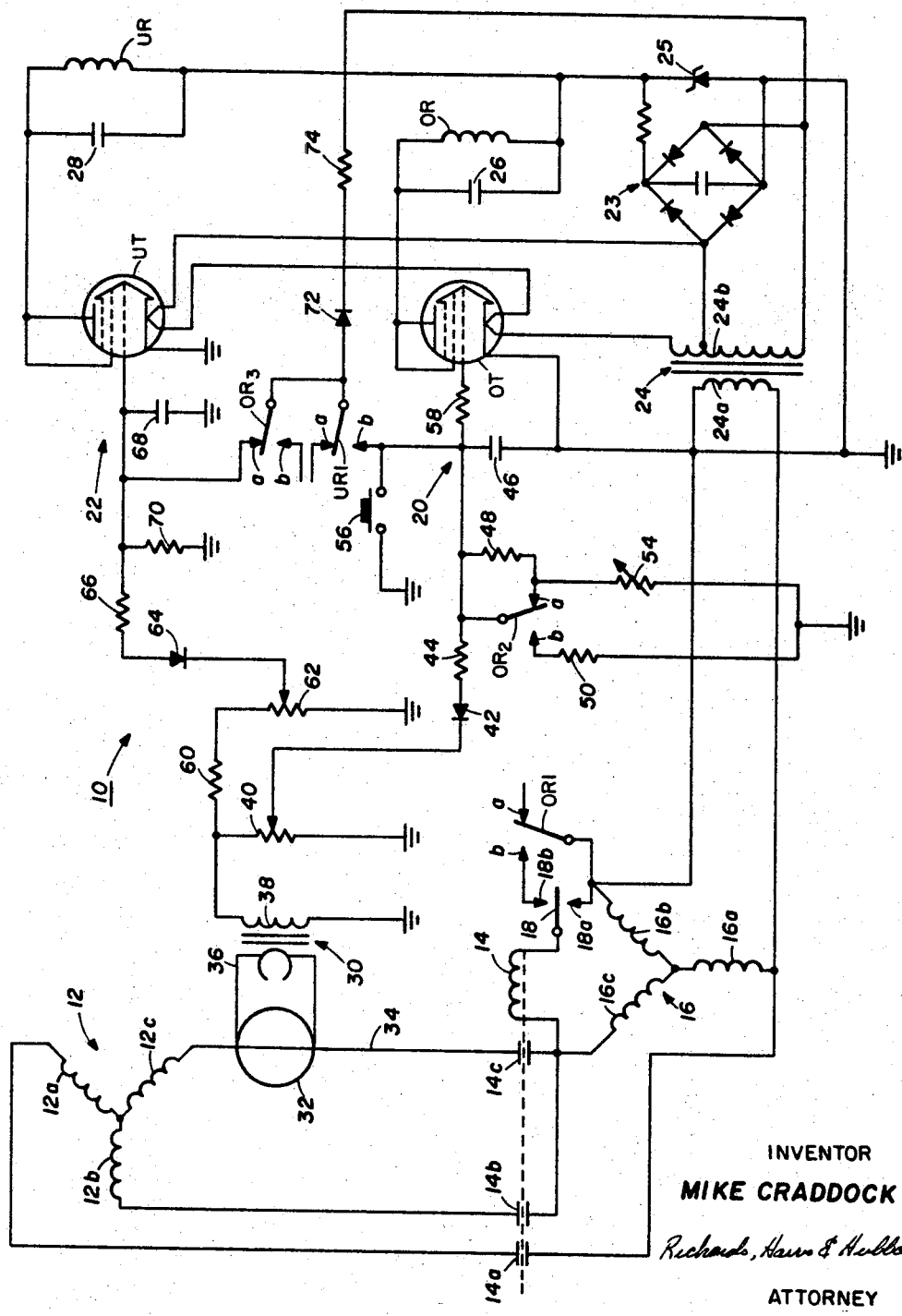
INVENTOR
MIKE CRADDOCK
Richards, Harris & Hubbard
ATTORNEY

United States Patent Office 3,417,290
Patented Dec. 17, 1968

3,417,290
OIL WELL PUMPING UNIT CONTROL CIRCUIT
Mike Craddock, 1804 Dixie, Big Spring, Tex. 79720
Filed Oct. 24, 1966, Ser. No. 589,076
10 Claims. (Cl. 317—13)

This invention relates generally to oil well pumping units, and more particularly, but not by way of limitation, relates to an improved circuit for automatically operating and protecting oil well pumping units driven by an electric motor.

Nonflowing oil wells are usually pumped either by a walking beam type pump jack or a centrifugal pump located either at the surface or downhole. Many devices have been proposed for automatically protecting the electric motors used to operate these pumping units which are typically driven by a three-phase motor. Both single and three-phase motors can be damaged as a result of either an over current, an under current, an over voltage or an under voltage, and three-phase motors can be damaged by a phase failure. Gross conditions of this type are usually caused by malfunctions of the power supply, but may sometimes be caused by mechanical failure of the pumping unit such as separation of the rod line, freezing of the subsurface pump, loosening of the counterbalance weights, etc. In many instances, if the pumping unit is not shut down, considerably more extensive damage may be done. Similar problems exist in the operation of almost any electrical motor or other electrical device.

In order to operate an oil well efficiently, it is desirable to pump fluid so long as the fluid is present in the annulus, but to stop the pumping operation when the well has been "pumped off" and all fluid exhausted. If the pump is operated after the well is "pumped off," considerable damage due to pounding of the pump can result.

Therefore, an object of this invention is to provide a circuit device for protecting an electric motor against an over current, an under current, an over voltage, an under voltage, or a phase failure, while still permitting the motor to draw a sufficiently high current to start.

Another important object is to provide a circuit which will automatically shut down an oil field pumping unit as the result of most mechanical failures.

Still another object is to provide a means for automatically stopping operation of the pumping unit when the well is pumped off, and automatically restarting the unit after a predetermined period of time, provided fluid is again present at the pump.

Another important object of the invention is to provide such a device which is relatively simple to construct, has a long and trouble-free service life, and is economical to build and maintain.

A further object of the invention is to provide such a device which is very simple and easy to install and which may be used on a wide variety of different motors and pumping units.

Another very important object of the invention is to provide such a circuit that is fail safe.

These and other objects are accomplished by a circuit including a means for sensing the current level supplied to the motor and producing a voltage signal representative of the current level. This voltage signal is rectified, filtered and stored on a first capacitor as an over current voltage signal. The over current voltage signal is used to control current to the coil of an over current relay. The voltage signal is also rectified, filtered and stored on a second capacitor as an under current voltage signal. The under current voltage signal is used to control current to the coil of an under current relay. The over current relay has one normally open pair of contacts which is used to control current to the motor, and a second normally closed pair of contacts which is used to charge the under current capacitor to a level sufficiently high to de-energize the under current relay. The under current relay has a pair of normally open contacts which are connected, when closed, to charge the first capacitor to a voltage level which will de-energize the over current relay.

The invention also contemplates special features which permit adjustment of the under current and over current levels, provide for an adjustable, predetermined time interval before the motor is automatically restarted, and provide for high current starts. Further, in accordance with a specific aspect of the invention, the relays are controlled by grid controlled tubes in which the cathode-to-plate voltage of each is derived from the power supply to the motor so that the circuit will be sensitive to changes in voltage levels above and below predetermined values as a result of changes in the cathode-to-plate voltage of the tubes.

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

The figure is a schematic circuit diagram of a device constructed in accordance with the present invention.

Referring now to the drawing, a circuit device constructed in accordance with the present invention is indicated generally by the reference numeral 10. The device 10 is illustrated as being used to control the operation of a three-phase motor 12 having windings 12a, 12b and 12c, although it is to be understood that the device 10 may be used to control a single phase motor or any other electrical device having similar characteristics. In accordance with a specific aspect of the invention, the motor 12 is used to power an oil well pumping unit. Current to the motor is controlled by a relay 14 having contacts 14a, 14b and 14c. Power is typically supplied to operate both the circuit 10, the motor 12 and the relay 14 by the secondary windings 16a, 16b and 16c of a three-phase power transformer 16.

A three position mode switch 18 provides either manual or automatic operation of the motor 12. When mode switch 18 is in the center position illustrated, the coil of relay 14 is deenergized and the motor 12 is off. When the switch 18 is manually moved against contact 18a, relay 14 is energized, which in turn energizes the motor 12. The circuit may be placed in automatic operation by moving mode switch 18 against contact 18b. Then the coil 14 may be energized through the circuit including the normally open contact OR₁ of an over current relay which will hereafter be described.

In the drawing, the switchblades of all relays are illustrated in their normal positions, that is, the position when the coil of the relay may be considered as de-energized and the relay thus "dropped out" or "open." Also, the normally closed contacts are designated with the reference character *a* and the normally open contacts are designated by the reference character *b*.

The circuit 10 includes an over current section indicated generally by the reference numeral 20, and an under current section indicated generally by the reference numeral 22.

The power to operate both the over current and under current section is derived from the secondary 16 by a transformer 24. The primary winding 24a of the transformer is connected across secondary windings 16a and 16b of the three-phase power transformer 16. The voltage across windings 16a and 16b typically varies from about 420 volts to about 520 volts in the oil field. The over current section 20 has a grid controlled tube OT and the under current section has an identical tube UT. The filaments of the tubes OT and UT are connected in series across a portion of the secondary winding 24b so that a portion of the A.C. voltage, typically 10 volts, is applied across the filaments. The remaining portion of the secondary winding 24b is connected across the input of a regulated D.C. power supply comprised of full wave rectifier bridge 23 and a Zener diode 25. The regulated power supply typically provides about 115 v. D.C., ±5%, across the Zener diode 25, so long as the voltage across secondary windings 16a and 16b remains between about 420 v. and about 520 v. If the line voltage exceeds these limits, then the regulated D.C. voltage changes sufficiently for the device 10 to stop the motor as will hereafter be described. It is to be understood that the specific voltage values are merely typical and are mentioned merely to assist in understanding the operation of the device.

The cathode-plate circuit of over current tube OT and the coil of an over current relay OR are connected in series across the D.C. power supply. A capacitor 26 is provided to filter the power supply and smooth the operation of the relay. Similarly, the cathode-plate current of the under current tube UT and the coil of an under current relay UR are connected in series across the D.C. power supply, and a capacitor 28 is provided to filter the power supply and smooth the operation of the relay.

A current transformer, indicated generally by the reference numeral 30, has a coil 32 which is disposed around one of the three conductors to the motor 12, and in particular around conductor 34 which is connected to phase winding 12c of the motor 12. The current induced in the winding 32 is inductively coupled from a high impedance primary winding 36 to a secondary winding 38 having a large number of turns so as to produce a voltage across the secondary winding that is representative of the instantaneous current level in conductor 34.

A portion of the voltage signal induced across the secondary winding 38 is selected by means of a variable resistor 40 and applied to an over current filter circuit which rectifies and integrates the selected portion of the voltage signal and stores the integrated value on a capacitor. The over current filter circuit includes a diode 42, a current limiting resistor 44 for protecting diode 42, and a resistance circuit including switchblade $OR_2$ of over current relay OR and alternative resistor paths 50 and 54, and a parallel capacitor circuit 46. A very large resistor 48 connects variable resistor 54 around switchblade $OR_2$.

As will hereafter be described in greater detail, under normal operating conditions the over current relay OR is energized so that switch blade $OR_2$ will be moved against normally open contact $b$ and resistor 50 will be connected in the filter circuit. However, when over current relay OR is de-energized, switchblade $OR_2$ moves against the normally closed contact $a$ so as to short resistor 48 and discharge capacitor 46 through resistors 52 and 54.

A reset button 56 is also connected in parallel with capacitor 46 to discharge the capacitor and provide for an immediate restart when desired.

The voltage stored on capacitor 46 is applied through relatively small resistor 58 to the grid of over current tube OT and controls conduction of the tube. As a result of the filter circuit, a negative voltage is stored on capacitor 46 that is representative of the integrated or average value of the current through conductor 34. When this voltage becomes sufficiently negative, the current through tube OT is so low that relay OR drops out. Then when the current builds to a substantially higher level, relay OR will again be closed.

The voltage for controlling the under current tube UT is derived from the voltage induced in the secondary winding 38 of transformer 30 through a voltage divider network including fixed resistor 60 and variable resistor 62, and an under current integrating filter circuit. The under current filter circuit may be considered as including the rectifying diode 64, current limiting resistor 66, and the parallel resistor-capacitor branches formed by resistor 70 and capacitor 68. As a result, a negative voltage is stored on capacitor 68 that is representative of the average current through conductor 34 to the motor 12. This voltage is applied directly to the grid of tube UT and controls its conductance and therefore the operation of relay UR as heretofore described in connection with tube OT and relay OR.

Capacitor 68 is charged highly negative to insure that relay UR remains open when over current relay OR is de-energized or open through the normally closed contact of switchblade $OR_3$, diode 72, current limiting resistor 74, and the secondary winding 24b. When relay UR is energized and closed, switchblade $UR_1$ is closed against normally open contact $b$ and capacitor 46 is charged highly negative through the diode 72 and resistor 74 to block conduction of tube OT and cause relay OR to drop out.

*Operation*

Assume first that the master switch (not illustrated) is open so that the entire circuit shown in the drawing is deenergized. Then both the over current relay OR and the under current relay UR are not energized so that the switchblades $OR_1$, $OR_2$ and $OR_3$, and $UR_1$ are in the normal positions illustrated. Then when the master switch is closed and transformer 24 energized, capacitor 68 will be immediately charged negatively through diode 72 and resistor 74 so that the voltage at the control grid of under current tube UT is highly negative. This insures that relay NR will remain open. On the other hand, there is no charge on capacitor 46 so that the control grid on over current tube OT is essentially at ground potential, which is the same potential as the cathode.

As the filaments of tubes OT and UT are heated by the current induced in the secondary winding 24b, the over current tube OT conducts heavily so as to energize relay OR and close the switchblades $OR_1$, $OR_2$ and $OR_3$. When switchblade $OR_1$ closes, relay 14 is energized, thus closing contacts 14a–14c to energize the motor 12. Since under current tube UT is nonconductive, relay UR remains open. The initial high current through conductor 34 required to start motor 12 will induce a relatively high voltage in the secondary winding 38. However, since capacitor 46 is not charged, the resulting high current will be absorbed by capacitor 46 before the control grid of the over current tube OT becomes sufficiently negative to cause the over current relay OR to drop out. The resistors 44 and 58 insure that the capacitor 46 is charged before the voltage is applied to the grid of the tube OT.

After the motor 12 has achieved full operating speed, the current through conductor 34 will vary cyclically in accordance with the load on the motor. In the operation of a standard pump jack, this current may vary over a significant range of values which are substantially in excess of either the maximum or minimum current which would be permitted on a continuous basis. However, the filter circuits have an integration or averaging period in excess of the load cycle and average out the current fluctuations due to the changing level on the motor. Thus, as capacitor 46 is continually charged negatively through the diode 42, the capacitor is also continually discharged through resistor 50, and to some extent through resistors 48 and 54. The variable resistor 40 is manually adjusted so that under normal operation of the motor 12, the voltage on capacitor 46, and therefore the voltage at the control grid of the over current tube OT, is just slightly more positive than that which results in the current through tube OT falling to the level where the relay OR will drop out and return the switchblades $OR_1$, $OR_2$ and $OR_3$ to the normal positions. In a typical embodiment of the invention, relay OR drops out when the voltage at the control grid reaches about −4.0 volts, and is pulled in when the vlotage on the grid reaches about −2.5 volts.

After relay OR was initially pulled in to start the motor 12 and move switchblade OR₃ to normally open contact b, capacitor 68 began to discharge through resistor 70 and to assume a more positive potential. However, as motor 12 assumes normal operation, the negative voltage on capacitor 68 is maintained at a sufficiently negative level to prevent tube UT from conducting to a degree sufficient to cause relay UR to pull in. This level is selected by adjustment of resistor 62 so that a slight decrease in the current through conductor 34 will cause the control grid of the tube UT to become sufficiently positive to close under current relay UR. In the typical embodiment of the circuit mentioned, the relay UR is pulled in, i.e., closed, when the potential of the control grid of the tube UT reaches about −2.0 volts and drops out when the control grid reaches a potential of about −12.0 volts. The circuit 10 permits normal operation of motor 12 so long as the average current through conductor through conductor 34 remains within narrowly defined limits.

Over current condition

If the current through conductor 34 increases above a predetermined maximum value, the negative voltage on capacitor 46 will become more negative until the current through over current tube OT will be reduced to the current level at which relay OR will drop out. Then switchblades OR₁, OR₂ and OR₃ will return to the normal positions illustrated. When switchblade OR₁ opens, relay 14 is opened and motor 12 stopped. Switchblade OR₃ then applies a highly negative charge to capacitor 68 to insure that relay UR remains de-energized and prepare the circuit for a restart. Switchblade OR₂ moves against contact a and short circuits resistor 48, and capacitor 46 then discharges through switchblade OR₂ and resistor 54. This condition persists until capacitor 46 discharges to a more positive level and tube OT conducts sufficiently for relay OR to pull in. The period of time relay OR is open and motor 12 is off can be relatively prolonged, typically about thirty minutes, and is determined by the setting of the resistor 54.

After the negative voltage on the capacitor 46, which it will be recalled might be about −4.0 volts, has been bled off to about −2.5 volts, the tube OT again conducts sufficient current to energize relay OR and thus pull in switchblades OR₁, OR₂ and OR₃. If the condition causing the over current situation has ceased to exist, the motor 12 will then be operated in the normal manner. However, if the condition causing the over current continues to exist, the capacitor 46 will again be charged sufficiently negative to cause relay OR to again drop out and de-energize the motor. The capacitor 46 will again be discharged through resistor 54 and the procedure repeated indefinitely until the condition causing the over current is eliminated.

Under current condition

On the other hand, if an under current condition develops, the negative voltage on capacitor 68 will be reduced, i.e., will become more positive, so that the current through relay UR will increase to the level necessary to pull the relay UR in. This will move siwtchblade UR₁ against normally open contact b so that capacitor 46 will immediately be charged negatively from the secondary winding 24b through the diode 72 and resistor 74 until the current level through over current tube OT falls below that necessary to hold over current relay OR in. As relay OR drops out, switchblade OR₁ opens and stops the motor 12. At the same time, switchblade OR₃ will charge capacitor 68 highly negative, thus terminating conduction of the tube UT and again dropping out the under current relay UR to open switchblade UR₁. Capacitor 46 can then discharge through switchblade OR₂ and resistor 54. Then when the charge on capacitor 46 reaches a sufficiently positive value, the over current relay OR is again pulled in and the motor 12 re-energized. Normal operation will then be resumed unless the condition causing the under current persists, in which case the procedure will again be repeated until the condition causing the under current is eliminated.

It should be noted that both the over current and the under current limits are independently adjustable by means of variable resistors 40 and 62. Similarly, the down time of the motor 12 is independently adjustable by means of resistor 54. The negative charge on capacitor 46 which causes the down time can be immediately bled off by closing the reset button 56. The selector switch 18 provides a means whereby the circuit 10 can be bypassed and the operation of the motor 12 controlled manually. The use of the switchblade OR₂ permits independent adjustment of either the maximum current level permissible or the down time because the capacitor 46 is discharged through the fixed resistor 50 during the filtering or integration function, but is discharged through the resistor 54 during the period when the motor 12 is de-energized. It should also be noted that variable resistors 40 and 62, together with the filter circuits, permit the maximum and minimum current values to be independently adjusted so that the circuit will be very sensitive and will respond to any undesirable condition very rapidly even though the instantaneous current through conductor 34 may vary substantially both above and below these values during any one cycle of the pumping unit. Resistors 40 and 62 also permit installation of the same circuit on a wide variety of different types of motors on different pumping units, as well as on motors, transformers, or other electrical devices.

Voltage sensitive

The circuit 10 is also sensitive to excess voltage changes because of the fact that the cathode-to-plate voltages of the tubes OT and UT are derived from the regulated power supply 23 which in turn is derived from the voltage of the line power to motor 12. Thus, if the voltage to the motor 12 decreases below that required to maintain the D.C. voltage level across Zener diode 25, typically below about 420 v. A.C., the plate-to-cathode voltage of the over current tube OT will decrease while the potential of the control grid will remain constant. As a result, relay OR will drop out and stop operation of the motor. On the other hand, if the voltage to the motor 12 increases above a safe maximum, typically about 520 v. A.C., the plate-to-cathode voltage of the under current tube UT will increase while the potential of the control grid will remain constant, resulting in an increase in current through the under current relay UR₂ which will pull relay UR in, thus closing switchblade UR₁ to charge capacitor 46 negative until relay OR drops out to stop operation of the motor.

As previously mentioned, the control circuit 10 can be used with either a single-phase or three-phase system. When used with a three-phase system, as illustrated, it should be noted that the circuit is sensitive to phase failures. The primary winding 32 of current transformer 30 may be placed around any one phase of the current to the motor because a failure of any one phase necessarily results in a significant change in the current through each of the other phases. The primary winding 24a of the power transformer may be connected across any two phases of the secondary winding of line transformer 16 and is therefore sensitive to a change in voltage in either phase. In the event of a phase failure, either the current or the voltage will change, either up or down, resulting in the motor 12 being shut down. If there is no change in the current or the voltage, then, of course, no harm is done to the motor, and operation may continue.

As previously mentioned, since capacitor 46 is not initially charged, a high current can be drawn by the motor 12 for starting without tripping out the overload relay OR because capacitor 46 must first be charged. However, if the high current situation persists beyond a suitable period, relay OR will drop out, thus stopping operation of the motor. On the other hand, after the circuit 10 is placed in operation, capacitor 46 is charged negatively to a level very close to the level at which the over current relay OR will drop out. Then a relatively slight overloading of the motor will produce an almost instantaneous response. This response is enhanced by the low RC time constant provided by the low impedance of diode 42 when conducting in the forward direction. However, diode 42 provides a high impedance in the reverse direction to hold the charge on capacitor 46 and thus permit averaging during cycles of the pump and also averaging of momentary increases in current to the motor which are not harmful. This ability to trip quickly is highly desirable to protect the motor from serious overload. Also, quick tripping is needed in case of a mechanical problem to prevent damage. In this regard, it is to be pointed out that any mechanical problem of a serious nature, such as a parting of the rods, loosening of the counterbalance weights, freezing of the gearbox, or any other similar malfunction, will result in either an over current or an under current which will cause the circuit 10 to stop operation of the motor.

Another important advantage of the circuit 10 is that it will automatically operate as a pump-off device with a predetermined down time in the event the fluids in the pump cavity are exhausted. When this occurs, the device 10 stops operation of the motor as a result of either an over current or an under current, depending upon the type of pumping unit being used. Then the capacitor 46 is discharged through the resistor 54 at a rate determined by the RC time constant of the components. This is typically set somewhere between three and thirty minutes. At the end of that time, operation of the pump 12 is again instigated. If fluids are present, the pump is operated until the fluids are exhausted, then the shut down cycle is repeated. However, if no fluids are present, the device 10 again stops operation of the motor 12. Thus, the operation of the device 10 protects the pump and stuffing box by preventing its operation in the absence of a fluid, prevents the waste of electrical energy, and in most instances increases the production of the well. It is important to note that the down time can be adjusted independently of the maximum current value by the variable resistor 54.

Although a preferred embodiment of the invention has been described in detail, it is to be understood that various changes, substitutions and alterations can be made therein without departing from the spirit and scope of the invention as defined by the appended claims. For example, within the broader aspects of the invention, the circuit may be transistorized.

What is claimed is:

1. A control circuit for the electric motor of an oil well pumping unit comprising:

sensing circuit means for sensing the current level to the motor and producing a first electrical signal representative of the current level, first filter circuit means including a first capacitor for integrating the first electrical signal over a period of time exceeding the load cycle of the motor and storing a voltage on the first capacitor representative of the average of the first electrical signal during the time period, first control circuit means including a voltage controlled first amplifier means for driving the coil of a first relay, the first amplier means being connected to the first filter circuit means such that the first voltage is applied to control the first amplifier means whereby the first relay is pulled in when the voltage on the first capacitor reaches a low value and drops out when the voltage reaches a high value, second filter circuit means including a second capacitor for integrating the first electrical signal over a period of time exceeding the load cycle of the motor and storing a second voltage on the second capacitor representative of the average of the first electrical signal during the time period, second control circuit means including a voltage controlled second amplifier means for driving the coil of a second relay, the second amplifier means being connected to the second filter circuit means such that the second voltage is applied to control the second amplifier means whereby the second relay is pulled in when the voltage on the second capacitor reaches a low value and drops out when the voltage on the second capacitor reaches a high level, the first relay having a first set of normally open contacts connected, when closed, to supply power to the motor, and a second set of normally closed contacts connected, when closed, to charge the second capacitor to the high level, and the second relay having a third set of normally open contacts connected, when closed, to charge the first capacitor to the high level, whereby when the current to the motor exceeds a predetermined maximum, the first relay will drop out to stop the motor and charge the second capacitor and insure that the second relay remains dropped out, and will remain dropped out until the first capacitor is discharged sufficiently for the first relay to be pulled in, and when the current to the motor falls below a predetermined minimum after the motor has started, the second relay will pull in, and the first capacitor will be charged until the first relay drops out to stop the motor until the first capacitor is discharged to the low level.

2. The control circuit defined in claim 1 wherein the first filter circuit means includes the first capacitor and a resistance connected in parallel, and rectifier means interconnecting the sensing circuit means and the capacitor for charging the capacitor whereby the first capacitor will be discharged through the resistance when the motor is stopped.

3. The control circuit defined in claim 2 wherein the resistance is comprised of a first branch including a first resistor and a set of normally open contacts of the first relay and a second branch including a second, variable resistor and a set of normally closed contacts of the first relay whereby the first branch will be connected in the circuit when the circuit acts as a filter and the second branch will be connected in the circuit when the capacitor is being discharged through the resistance so that the down time of the circuit may be varied.

4. The control circuit defined in claim 1 wherein the sensing circuit means comprises a current transformer for disposition around a conductor carrying current to the motor and the primary winding of a voltage step-up transformer connected in series, and first and second variable resistors connected in series with the secondary winding of the voltage step-up transformer, the first and second resistors providing a selectively variable voltage signal for application to the first and second filter circuit means, respectively, whereby the over current and under current limits can be individually adjusted.

5. The control circuit defined in claim 1 wherein each amplifier means comprises a grid controlled tube the cathode and plate of which are connected in series with the coil of the respective relay.

6. The control circuit defined in claim 5 wherein the cathode-plate circuit of each tube and the coil of the respective relays are connected across a voltage supply that fluctuates with the voltage of the power to the motor whereby the control circuit will be sensitive to abnormal variations in the voltage supplied to the motor.

7. The control circuit defined in claim 6 wherein the power supply for the tubes of the control circuit comprises the secondary winding of a power transformer connected in series with the tube and coil of the respective relays.

8. The control circuit defined in claim 7 wherein the second set of normally closed contacts completes, when closed, a series circuit across the secondary winding of the power transformer comprised of the second capacitor, a diode and a resistance, and the third set of normally closed contacts connects, when closed, a series circuit across the secondary winding of the power transformer comprised of the second capacitor, the diode and the resistance.

9. A control circuit for the electric motor of an oil well pumping unit comprising:

a current transformer having a winding which can be inductively coupled to a conductor supplying power to the motor, a voltage step-up transformer the primary winding of which is coupled to the winding of the current transformer, a first variable voltage divider connected across the secondary winding of the step-up transformer, a second variable voltage divider connected across the secondary winding of the step-up transformer, a power transformer having a primary winding connectable across the power supply to the motor, a grid-controlled over current tube and the coil of an over current relay connected in series across the secondary winding of the power transformer, first circuit means connecting the grid of the over current tube to the first variable voltage divider including a first diode and a resistor, a first capacitor branch and a first resistance branch connected in parallel across a portion of first voltage divider means by the diode of the first circuit means such that the voltage on the first capacitor is applied to the grid of the over current tube, a grid-controlled under current tube and the coil of an under current relay connected in series across the secondary winding of the power transformer, second circuit means connecting the grid of the under current tube to the second variable voltage divider including a second diode and a resistance, a second capacitor branch and a second resistance branch connected in parallel across a portion of the second voltage divider by the second diode such that the voltage on the second capacitor is applied to the grid of the under current tube, the over current relay having a first pair of normally open contacts connected, when closed, to supply power to the motor and a second pair of normally closed contacts connected in a series circuit including the second capacitor and a third diode across the secondary winding of the power transformer, and the under current relay having a third pair of contacts connected in a series circuit including the first capacitor and the third diode across the secondary winding of the power transformer.

10. The control circuit defined in claim 9 wherein the first resistance branch includes first and second subbranches connected in parallel, the first subbranch including a fourth set of normally open contacts of the over current relay and a resistor, and the second subbranch including a fifth set of normally closed contacts of the over current relay and a variable resistor.

References Cited

UNITED STATES PATENTS

| | | | |
|---|---|---|---|
| 2,259,958 | 10/1941 | Levy | 318—454 X |
| 3,119,049 | 1/1964 | Gagniere | 317—13 X |
| 3,243,658 | 3/1966 | Blackburn | 317—31 |
| 3,248,608 | 4/1966 | Farkas et al. | 317—13 |

LEE T. HIX, *Primary Examiner.*

J. D. TRAMMELL, *Assistant Examiner.*

U.S. Cl. X.R.

317—31, 51; 318—454